United States Patent
Thubert et al.

(10) Patent No.: US 7,366,111 B2
(45) Date of Patent: Apr. 29, 2008

(54) ARRANGEMENT FOR PROVIDING OPTIMIZED CONNECTIONS BETWEEN PEER ROUTERS IN A TREE-BASED AD HOC MOBILE NETWORK

(75) Inventors: Pascal Thubert, La Colle sur Loup (FR); Patrick Wetterwald, Mouans Sartoux (FR); Vincent Jean Ribiere, Biot (FR); Eric M. Levy-Abegnoli, Valbonne (FR)

(73) Assignee: Cisco Technology, Inc., San Jose, CA (US)

( * ) Notice: Subject to any disclaimer, the term of this patent is extended or adjusted under 35 U.S.C. 154(b) by 419 days.

(21) Appl. No.: 11/101,394

(22) Filed: Apr. 8, 2005

(65) Prior Publication Data
US 2006/0227724 A1   Oct. 12, 2006

(51) Int. Cl.
*H04L 12/28* (2006.01)
(52) U.S. Cl. .................. 370/254; 370/238; 370/256; 370/310.2; 370/328; 370/349; 370/392; 370/395.31; 370/408; 370/242; 379/114.13; 709/242
(58) Field of Classification Search ............... 370/254, 370/238, 242, 256, 255, 310, 328, 338, 349, 370/351, 352, 389, 392, 395.31, 400, 401, 370/407, 408, 310.2; 379/114.13; 709/242, 709/238
See application file for complete search history.

(56) References Cited

U.S. PATENT DOCUMENTS

| 6,850,532 B2 | 2/2005 | Thubert et al. |
| 6,954,790 B2 | 10/2005 | Forslow |
| 2002/0062388 A1* | 5/2002 | Ogier et al. ............... 709/238 |
| 2003/0161287 A1* | 8/2003 | Venkitaraman et al. ..... 370/338 |
| 2004/0032852 A1 | 2/2004 | Thubert et al. |
| 2004/0057440 A1 | 3/2004 | Thubert et al. |
| 2004/0081152 A1* | 4/2004 | Thubert et al. ............ 370/392 |

(Continued)

FOREIGN PATENT DOCUMENTS

EP   1 324 532 A2   7/2003

OTHER PUBLICATIONS

Ernst et al., "Network Mobility Support Terminology", IETF Internet Draft. <draft-ernst-monet-terminology-00.txt>, Feb. 2002.

(Continued)

*Primary Examiner*—Nguyen T. Vo
*Assistant Examiner*—Shaima Q. Aminzay
(74) *Attorney, Agent, or Firm*—Leon R. Turkevich

(57) ABSTRACT

Mobile routers in a tree-based network topology with a single clusterhead in an ad hoc network establish connectivity based on each attached mobile router sending a neighbor advertisement message to an attachment mobile router via a corresponding egress interface. Any neighbor advertisement message received by a mobile router is used to identify specified network prefixes that are reachable via the source of the neighbor advertisement message. Each attached mobile router outputs to its attachment router another neighbor advertisement message that specifies the network prefix used by the mobile router, and the specified network prefixes from its attached mobile routers. The mobile router also identifies peer mobile routers having the same depth, and selectively shares limited routing information with the peer routers, enabling the mobile router to bypass the clusterhead and reach remote prefixes via the peer routers without burdening the tree.

37 Claims, 8 Drawing Sheets

U.S. PATENT DOCUMENTS

| | | | |
|---|---|---|---|
| 2004/0103275 | A1 | 5/2004 | Ji et al. |
| 2004/0202183 | A1 | 10/2004 | Thubert et al. |
| 2004/0228343 | A1 | 11/2004 | Molteni et al. |
| 2005/0265259 | A1* | 12/2005 | Thubert et al. .............. 370/255 |
| 2006/0007865 | A1 | 1/2006 | White et al. |
| 2006/0146730 | A1* | 7/2006 | Zeng et al. ................. 370/254 |
| 2007/0153707 | A1* | 7/2007 | Thubert et al. .............. 370/254 |

OTHER PUBLICATIONS

Baker, "An outsider's view of MANET", Network Working Group, Internet draft, <draft-baker-manet-review-01>, Mar. 17, 2002.

Moy, "OSPF Version 2", Network Working Group, Request for Comments: 2178, Jul. 1997.

Perkins et al., "Ad hoc On-Demand Distance Vector (AODV) Routing", Mobile Ad Hoc Networking Working Group, Internet Draft, <draft-ietf-manet-aodv-13.txt>, Feb. 17, 2003.

Johnson et al., "The Dynamic Source Routing Protocol for Mobile Ad Hoc Networks (DSR)", IETF MANET Working Group, Internet Draft, <draft-ietf-manet-dsr-09.txt>, Apr. 15, 2003.

Garcia-Luna-Aceves et al., "Source Tree Adaptive Routing (STAR) Protocol", IETF MANET Working Group, Internet Dtat, <draft-ietf-manet-star-00.txt>, Oct. 22, 1999.

Moy, "OSPF Version 2", Network Working Group, Request for Comments: 2328, Apr. 1998.

Coltun et al., "OSPF for IPv6", Network Working Group, Request for Comments: 2740, Dec. 1999.

U.S. Appl. No. 10/887,919, filed Jul. 12, 2004, White et al.

Baker et al., "Problem Statement for OSPF Extensions for Mobile Ad Hoc Routing", Mobile Ad Hoc and OSPF Working Group, Internet Draft, <draft-baker-manet-ospf-problem-statement-00>, Sep. 23, 2003, pp. 1-20.

Chandra, "Extensions to OSPF to Support Mobile Ad Hoc Networking", OSPF Working Group, Internet Draft, <draft-chandra-ospf-manet-ext-02>, Oct. 21, 2004, pp. 1-33.

Clausen et al, "DB Exchange for OSPFv2 Wireless Interface Type", IETF MANET Working Group, Internet Draft, <draft-clausen-manet-ospf-dbx-00.txt>, pp. 1-24, date unknown.

Ogier, "MANET Extension of OSPF using CDS Flooding", OSPF and Mobile Ad Hoc Networks Working Groups, Internet Draft, <draft-ogier-manet-ospf-extension-03.txt>, Feb. 21, 2005, pp. 1-36.

Pillay-Esnault, "OSPF Refresh and Flooding Reduction in Stable Topologies", Network Working Group, Internet Draft, <draft-pillay-esnault-ospf-flooding-07.txt>, Jun. 2003, pp. 1-5.

Spagnolo et al., "Design Considerations for a Wireless OSPF Interface", MANET/OSPF Working Group, Internet Draft, <draft-spagnolo-manet-ospf-design>, Apr. 2004, pp. 1-32.

Ahrenholz et al, "OSPFv2 Wireless Interface Type", Mobile Ad Hoc and OSPF Working Groups, Internet Draft, <draft-spagnolo-manet-ospf-wireless-interface-01>, May 12, 2004, pp. 1-28.

Narten et al, "Neighbor Discovery for IP Version 6 (IPv6)", Network Working Group, Request for Comments: 2461, Dec. 1998, pp. 1-93.

Clausen et al., "Optimized Link State Routing Protocol (OLSR)", Network Working Group, Request for Comments: 3626, Oct. 2003, pp. 1-75.

\* cited by examiner

ARRANGEMENT FOR PROVIDING OPTIMIZED CONNECTIONS BETWEEN PEER ROUTERS IN A TREE-BASED AD HOC MOBILE NETWORK

BACKGROUND OF THE INVENTION

1. Field of the Invention

The present invention relates to routing protocols for establishment of an ad hoc mobile network by mobile routers, where the routing protocols are optimized for minimal overhead for accommodating rapid topology changes in the ad hoc mobile network.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has a Mobile IP Working Group that has developed routing support to permit IP nodes (hosts and routers) using either IPv4 or IPv6 to seamlessly "roam" among IP subnetworks. In addition, the Mobile Networks (MONET) group (renamed as the Network Mobility (NEMO) group) has published different Internet Drafts, including an Internet Draft by Thierry Ernst, entitled "Network Mobility Support Terminology", February 2002.

According to the NEMO group, a mobile network may be composed by one or more IP subnets and is connected to the global Internet via one or more Mobile Routers (MR). The mobile router has at least two network interfaces: an egress interface toward the wide area network, and an ingress interface from within the mobile network. Mobile network nodes may include local fixed nodes (LFN) (nodes unable to change their point of attachment while maintaining ongoing sessions), local mobile nodes (LMN) (mobile nodes that belong to the mobile network and able to change their point of attachment within the mobile network or outside the mobile network), and visiting mobile nodes (VMN) (mobile nodes that not belong to the mobile network and that can change their point of attachment from outside the mobile network to inside the mobile network). Each of the nodes may be either a host or a router.

Hence, a mobile router is a router configured for establishing a communication link between the mobile network and an attachment router. As apparent from the foregoing, an objective of NEMO is providing mobile nodes with protocols for establishing connectivity with a wide area network, such as the Internet. The mobile router thus serves as a gateway to route packets between the mobile network and the Internet.

Unfortunately, existing Internet-based routing protocols that assume a persistent connection to a wide area network such as the Internet rely on the ability to aggregate reachability to IP nodes, where all nodes sharing a common network link (such as a link of a top level mobile router connecting to an attachment router on the Internet) share the same routing prefix. Such aggregation creates a hierarchy of network prefixes that enables scalability. However, such a hierarchy is not possible in ad hoc networks.

The IETF has a Mobile Ad-hoc Networks (MANET) Working Group that is working to develop standardized MANET routing specification(s) for adoption by the IETF. According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

The MANET system is particularly suited to low-power radio networks that may exhibit an unstable topology, where wireless propagation characteristics and signal quality between a wireless transmission source and a receiver can be difficult to model and quantify. In a MANET, the device address is tied to the device, not a topological location, as there is no fixed network infrastructure. When the addressed device moves, therefore, the motion changes the routing infrastructure. Hence, as described in an Internet Draft by Baker, entitled "An Outsider's View of MANET" (Mar. 17, 2002), the fundamental behavior of a MANET is that a routing node carries with it an address or address prefix, and when it moves, it moves the actual address; when this happens, routing must be recalculated in accordance with the new topology. For example, each mobile router retains its address prefix; hence, neighboring mobile routers in a MANET may have distinct address prefixes.

Existing MANET protocols focus on the internal connectivity within the unstable topology between mobile devices; however, the existing MANET protocols suffer from the disadvantage that they provide a poor model for connecting to a wide area network such as the Internet.

MANET protocols can be divided into the following types: stateful (proactive); and stateless (reactive). Proactive MANET protocols distribute routing information throughout the MANET network, enabling the routers within the MANET network to store route information before a data packet needs to be routed; hence, a router determines how to forward a packet based on accessing routing information from an internal table. However, proactive protocols suffer the disadvantage of requiring update messages to update obsolete route entries: the necessity for update messages increases with a corresponding desire for an improvement in route optimization.

Proactive MANET protocols can be subdivided into two subtypes, or "families": Optimized Routing Approach (ORA), and Least Overhead Routing Approach (LORA). The ORA type protocols are similar to routing protocols used in the Internet, in that they stress maintaining the best states to maintain the shortest path routes, at the expense of requiring more control messages to exchange routes. An example of an ORA type routing protocol is Open Shortest Path First (OSPF) (as specified by the IETF Request for Comments (RFC) 2178), or Intermediate System-to-Intermediate System (IS-IS) protocol (specified by the International Organization for Standardization document ISO 10589). However, the OSPF and IS-IS protocols suffer from the disadvantage that they may require up to a minute to converge (i.e., complete protocol communications necessary to establish a connection) and hence may not be able to converge quickly enough for a mobile router that is moving from one location to another. For example, in the case of two vehicles passing each other, each having a mobile router, there may exist approximately ten seconds for the mobile routers to establish a connection; hence, routing protocols requiring up to a minute to converge would be unable to establish a connection. Also note that OSPF requires link-state advertisements (LSAs) to be refreshed as they expire after 3600 sec, resulting in substantial burdens in distributing the LSAs.

Reactive protocols were developed to address the slow convergence of ORA type proactive protocols, where routing information is acquired only when needed. Examples of reactive protocols are described in an Internet Draft by Perkins et al., "Ad hoc On-Demand Distance Vector (AODV) Routing (draft-ietf-manet-aodv.13), Feb. 17, 2003, and an Internet Draft by Johnson et al., "The Dynamic Source Routing Protocol for Mobile Ad Hoc Networks (DSR) <draft-ietf-manet-dsr-09.txt>", Apr. 15, 2003. Reactive protocols require less bandwidth than proactive protocols, but the latency for many applications will increase substantially, resulting in long delays. Such delays become quite apparent if a mobile user attempts to execute a bandwidth-intensive application on the ad hoc network instead of a typical high-speed wired connection on the Internet using a conventional connection (e.g., hard-wired LAN, cable modem, etc.).

The LORA family of proactive protocols attempts to provide a compromise between the fully stateful (ORA family) protocols and the fully stateless (reactive) protocols. One example of a LORA-type protocol is described in an Internet Draft by Garcia-Luna-Aceves, et al., "Source Tree Adaptive Routing (STAR) Protocol <draft-ietf-manet-star.00.txt>", Oct. 22, 1999. However, even the disclosed STAR protocol suffers from disadvantages of requiring routing messages to establish a stable topology within the MANET network. For example, the STAR protocol requires a router to transmit the parameters of its source routing tree, including each link that the router needs to reach every known destination (and address range) in the ad hoc network or Internet. Although the STAR router attempts to conserve transmission bandwidth and energy by sending changes to its source routing tree only when the router detects new destinations, the possibility of looping, or the possibility of node failures or network partitions, the necessity of transmitting such parameters for each and every link still imposes substantial messaging requirements that affects bandwidth availability and network convergence times.

Hence, existing LORA-type protocols still provide only limited improvements in reducing convergence time and update messages between routers.

Commonly-assigned, copending application Ser. No. 10/856,809, filed Jun. 1, 2004, entitled "Arrangement for Providing Network Prefix Information from Attached Mobile Routers to a Clusterhead in a Tree-Based Ad Hoc Mobile Network", the disclosure of which is incorporated in its entirety herein by reference, describes a technique that provides optimized transfer of routing information between mobile routers having established a tree topology in an ad hoc mobile network. The tree-based network topology has a single clusterhead and attached mobile routers. Each attached mobile router has a default egress interface configured for sending messages toward the clusterhead, and ingress interfaces configured for receiving messages from attached network nodes that are away from the clusterhead. A neighbor advertisement message received from an ingress interface away from a clusterhead is used by the attached mobile router to identify specified network prefixes that are reachable via the source of the neighbor advertisement message. The attached mobile router outputs on its default upstream interface a second neighbor advertisement message that specifies the network prefix used by the attached mobile router, and the specified network prefixes from the neighbor advertisement message received on the ingress interface. Hence, the propagation of neighbor advertisement messages toward the clusterhead establishes connectivity with minimal routing overhead.

SUMMARY OF THE INVENTION

The inventors have realized that the tree-based ad hoc network topology that propagates neighbor advertisement messages toward the clusterhead, as described in the above-incorporated application Ser. No. 10/856,809, can be further optimized to reduce the necessity of network traffic passing via the clusterhead and routers connected to the clusterhead. In particular, it is highly desirable to prevent congestion in the clusterhead or routers connected to the clusterhead by establishing bypass routes that enable nodes of distinct branches to transfer data packets without the necessity of the data packets passing via the clusterhead.

However, concerns arise that a wide scale dissemination of routing information throughout the tree-based network topology according to existing routing protocols, such as OSPF flooding, may deteriorate the ability for the tree-based network topology to rapidly converge or adjust in response to movement by a node within the tree-based network topology.

There also is a need for an arrangement that enables routers to establish a tree-based ad hoc network topology using a minimal amount of routing information, and which enables bypass routes to be established without adversely affecting rapid convergence in response to detected changes in the topology.

These and other needs are attained by the present invention, where mobile routers having established a tree-based network topology with a single clusterhead in an ad hoc mobile network establish connectivity between the routers based on each attached mobile router sending a neighbor advertisement message to an attachment router mobile via a corresponding egress link. Any neighbor advertisement message received by a mobile router is used to identify specified network prefixes that are reachable via the source of the neighbor advertisement message. If the mobile router is not designated as the clusterhead, the mobile router outputs to its attachment router a second neighbor advertisement message that specifies the network prefix used by the mobile router, and the specified network prefixes from the attached mobile routers. The mobile router also identifies peer mobile routers having the same depth within the tree topology, and selectively shares routing information with the peer routers, enabling the mobile router to bypass the clusterhead and reach remote prefixes via the peer routers. Further, the remote prefixes are not included within the neighbor advertisement messages, preventing any additional overhead from adversely affecting the topology tree.

Hence, connectivity is established in a tree-based topology using minimal routes by routing received packets specifying known prefixes as destinations to the identified ingress interface, and routing unknown prefixes via the default egress interface for routing by an attachment router, while optimizing the tree using peer routers to bypass the clusterhead with minimal impact on the tree.

One aspect of the present invention provides a method in a mobile router configured for establishing communications within an ad hoc network. The method includes attaching to an attachment router, having advertised an attachment prefix, based on selecting a default attachment address within the attachment prefix and according to a protocol requiring establishment in the ad hoc network of a tree topology having a single clusterhead. The mobile router attaches to the attachment router at an identifiable depth relative to the clusterhead, and advertises a first address prefix distinct from the attachment prefix. The method also includes receiving at least one neighbor advertisement message from at least one corresponding attached mobile router having attached to the mobile router and that specifies a corresponding second address prefix, distinct from the first address prefix, is reachable via a corresponding second attachment address within the address space of the first address prefix. The method also includes selectively sharing routing information with a peer mobile router attached within the tree topology at said identifiable depth. The sharing of routing information includes sending to the peer mobile router first routing information, composed of the first address prefix and any second address prefixes having been received from neighbor advertisement messages, as reachable via the mobile router, and receiving from the peer mobile router second routing information specifying at least one remote address prefix is reachable via the peer mobile router, the at least one remote address prefix distinct from any of the attachment prefix, the first address prefix, and any second address prefix. The method also includes outputting to the attachment router a second neighbor advertisement message specifying the first routing information, wherein the second routing information received from any peer mobile router attached at said identifiable depth is not sent to the attachment router.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is considered an improvement over the tree-based ad hoc network described in the above-incorporated application Ser. No. 10/856,809, in that peer links are selectively utilized between peer routers that enable the clusterhead to be bypassed. As described below, the routing protocols used to share routing information between the peer routers is isolated from the propagation of neighbor advertisement messages, ensuring that no additional processing burden is imposed on the established tree.

Hence, connections between the mobile routers in the ad hoc tree are optimized without adversely affecting convergence of the tree due to, for example, movement within the tree.

Figure 1:
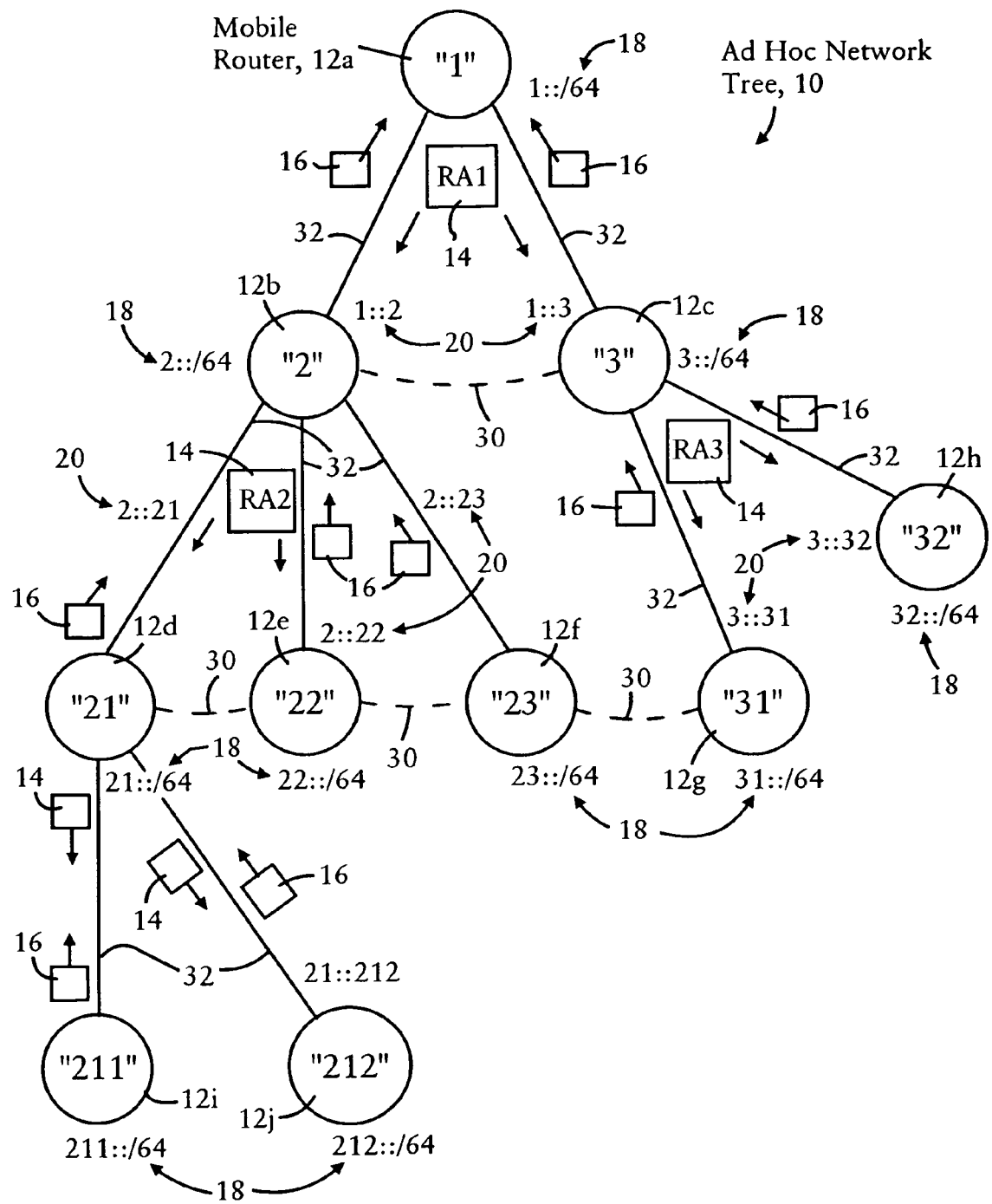
FIG. 1 is a diagram illustrating a mobile ad hoc network having multiple mobile routers connected to a mobile router serving as a clusterhead for a tree-based topology, with optimized peer links between peer routers, according to an embodiment of the present invention.

FIG. 1 is a diagram illustrating a mobile ad hoc network 10 formed by mobile routers 12 serving as at least one of an attached mobile router and an attachment mobile router. The mobile routers 12 and any mobile hosts (not shown) initially establish link layer connectivity between each other based on an autonomous mesh of link layer connections, for example wireless IEEE 802.11 connections. Mere link layer connectivity, however, does not provide any optimization of routing protocols between the mobile routers. Hence, the mobile routers 12 establish a mobile ad hoc network 10 at the network layer based on each mobile router 12 logically assigning source-destination network layer (e.g., IP) address pairs as one of an ingress link, an egress link, or a peer link. In other words, each mobile router 12 will identify whether a packet received on a wireless link should be associated as being logically received on an ingress network link, an egress network link, or a peer network link based on the link layer and/or IP source address of the packet and the routing protocols described herein.

Consequently, a single wireless IEEE 802.11 link may be used transport packets among different mobile routers 12, where each mobile router 12 determines whether a packet received on the wireless link should be logically assigned as having been received from an ingress link, an egress link, or a peer link.

Each attachment router (e.g., a clusterhead 12a) is configured for outputting a router advertisement message 14 that specifies a prescribed address prefix 18 used by the attachment router, and each attached mobile router (e.g., 12b, 12c) is configured for attaching to one of the attachment routers in response to received advertisement messages by selecting a default attachment address 20, and in compliance with a protocol requiring establishment of a tree topology having a single clusterhead 12a. Note that the address prefix (e.g., "1::/64") 18 used by a mobile router (e.g., 12a) refers to the address prefix used by the mobile router 18 in creating and maintaining an addressable subnet for routing of data packets to nodes connected to ingress ports of the mobile router 18; in other words, a mobile router 18 includes address table entries for routing packets within the subnet specified by the address prefix used by the mobile router 18.

According to the disclosed embodiment, the tree topology illustrated in the mobile ad hoc network 10 is relied upon in minimizing the amount of routing information needed to be transferred among mobile routers. In particular, a tree topology having a single clusterhead 12a inherently has no loops. Since the tree topology 10 inherently has no loops, attached mobile routers can be configured to provide no more than the minimum routing information necessary for an attached mobile router to identify network address prefixes that are reachable via an attached mobile node.

Hence, attached mobile routers (e.g., 12b, 12c) identify themselves to an attachment mobile router (e.g., 12a) by sending neighbor advertisement messages 16 that specify a network-in-node option, namely that a network node has at least one network address prefix. The network-in-node option specifies to the attachment mobile router (e.g., 12a) merely that a given network prefix 18 (e.g., 2::/64 of mobile router "2" 12b) is reachable via a default attachment address 20 (e.g., 1::2) within the address space of the address prefix 18 of the attachment router (i.e., the attachment prefix).

Hence, a neighbor advertisement message 16 from the attached mobile router 12b can be detected by the attachment mobile router 12a to specify merely that the network prefix "2::/64" 18 is reachable via the address "1::2" 20 which is within the address realm (i.e., address space) of the attachment prefix "1::/64" 18 used by the attachment mobile router 12a. Note that no further routing information (e.g., hop count, home address of a node, topology information, source routing information, link state information, etc.) needs to be sent to the attachment router 12a, since the attachment mobile router only needs to be aware of address prefixes of attached mobile routers. As described in detail below, the mobile routers 12 are configured for routing any packet specifying an unknown destination to its default attachment router; hence, the packet is routed toward the clusterhead 12a until a mobile router can identify the destination address relative to an identified network prefix 18.

Hence, the disclosed embodiment provides an efficient proactive routing protocol for ad hoc networks that minimizes the necessity of bandwidth and processing requirements to accommodate rapid topology changes by providing rapid convergence. Hence, the disclosed embodiment provides a LORA type routing protocol even more efficient than the above-described STAR protocol.

In addition, each of the attached mobile routers (e.g., 12b, 12c, 12d, 12e, 12f, etc.) are configured for selectively sharing routing information with peer mobile routers, i.e., mobile routers that are at the same depth within the tree 10. In particular, each mobile router 12 is configured for identifying peer mobile routers that are at the same depth within the tree 10, and utilizing peer links 30 to selectively share routing information, and send packets between peer mobile routers, enabling the clusterhead 12a to be bypassed. Unlike the attachment links 32 used to connect attached routers to attachment routers, however, the peer links 30 are not part of the tree 10, and therefore their existence and the peer routing information is not propagated up the tree toward the clusterhead; rather, the peer links 30 are considered an optimization of the tree 10, such that the peer routing information is shared only between the peer routers and, optionally, attached routers within the associated subtree. Further, the peer routing information is limited between peer routers in a manner that ensures that tree optimization is preserved.

Hence, a packet from the mobile router 12h destined for the mobile router 12i can be sent by the mobile router 12c to its peer mobile router 12b via the corresponding peer link 30, reducing the traffic encountered by the clusterhead 12a and reducing the distance traveled by one hop. Similarly, a packet from the mobile router ("31") 12g destined for the mobile router 12f can be sent directly via the corresponding peer link 30, resulting in a distance of one hop, as opposed to the three-hop distance via the peer link between the routers 12b and 12c, or the four-hop distance via the clusterhead.

A description will first be provided of formation of the tree topology, followed by a description of the use of the peer links 30 for optimizing communication throughout the tree 10. Additional details regarding the formation of the tree topology, and propagation of neighbor advertisement messages (i.e., attached router messages) are found in the above-incorporated application Ser. No. 10/856,809.

The disclosed embodiment dynamically assembles the layer 2 clusters into a tree-based topology model 10 as illustrated in FIG. 1 using the attachment techniques described in commonly-assigned, copending application Ser. No. 10/218,515, filed Aug. 15, 2002, entitled "ARRANGEMENT FOR ROUTER ATTACHMENTS BETWEEN ROAMING MOBILE ROUTERS IN A MOBILE NETWORK", published on Feb. 19, 2004 as U.S. Patent Application Publication US2004/0032852 A1, the disclosure of which is incorporated in its entirety herein by reference.

According to the disclosed embodiment, the ad hoc network 10 is organized into a tree-based topology cluster, where the clusterhead (i.e., a root of a tree) 12a is determined by having the highest relative preference metric visible to other mobile routers. Preference metric may be based on an explicit preference value, described below, or based on a tree depth identifier indicating the relative position of the mobile router relative to the clusterhead; in other words, tree depth indicates the number of hops to the clusterhead. A mobile router associates with the router advertisement (RA) originator by storing the information in the RA message in its default router list, and selecting the source of the RA message as its attachment router.

Hence, the mobile routers 12b through 12j choose attachment routers based on preference metrics specified in received router advertisement messages 14. As illustrated in FIG. 1, the mobile routers 12b and 12c, in response to detecting the unsolicited router advertisement message ("RA1") 14, add the RA1 message 14 to their internal default router lists 55, described in detail below with respect to FIG. 4. The mobile routers 12b and 12c select the mobile router 12a as their attachment router based on a specified preference metric (e.g., preference value, mobile router 12a advertised as a clusterhead, etc.).

For example, the mobile router 12b creates a default attachment address ("1::2") 20 on its egress interface that is within the address space of the address prefix "1::/64" 18 advertised by the clusterhead 12a; the mobile router 12b also adds an entry in its routing table that specifies that the address prefix "1::/64" is reachable via the default attachment address "1::2" 20. Similarly, the mobile router 12c creates a default attachment address ("1::3") 20 on its egress interface that is within the address space of the address prefix "1::/64" 18 advertised by the clusterhead 12a; the mobile router 12c also adds an entry in its routing table that specifies that the address prefix "1::/64" is reachable via the default attachment interface having been assigned the default attachment address "1::3".

The mobile routers 12b and 12c begin outputting respective router advertisement messages "RA2" and "RA3" 14, advertising their respective address prefixes 18 ("2::/64" and "3::/64"the tree depth/preference based on the clusterhead 12a being the top level mobile router. As described above, any unknown address is sent by a mobile router to its default attachment address; hence, the router advertisement messages "RA2" and "RA3" 14 need not specify the address prefix "1::/64" of the clusterhead, since all attached mobile routers (e.g., 12d, 12e, 12f, 12g, 12g) will forward unknown destinations by default to the mobile routers 12b or 12c.

The mobile routers 12d, 12e, 12f having the respective network prefixes 18 ("21::/64", "22::/64", and "23::/64")

attach to the mobile router 12*b* as their attachment router by selecting respective default attachment addresses 20 ("2::21", "2::22" and "2::23"). The mobile routers 12*g*, 12*h*, having the respective network prefixes 18 ("31::/64" and "32::/64") attach to the mobile router 12*c* as their attachment router by selecting respective default attachment addresses 20 ("3::31" and "3::32").

Similarly, the mobile router 12*d* outputs a router advertisement message "RA21" 14 advertising its address prefix 18 ("21::/64"). In response, the routers 12*i* and 12*j* having address prefixes 18 ("211::/64" and "212::/64") select respective default attachment addresses 20 ("21::211" and "21::212").

Assuming that no other information has been output into the network 10 other than the router advertisement messages 14, each mobile router only knows its default route toward the clusterhead 12*a*. In other words, none of the mobile routers 12 have any information related to any attachment nodes away from the clusterhead. For example, if the mobile router 12*i* ("211") wanted to send a ping to the mobile router 12*h* at the destination address "32::1", the ping would be transferred up to the clusterhead 12*a* by the mobile routers 12*d* and 12*b*, which are configured to output unknown destinations on their respective default attachment addresses. However, since the mobile router 12*a* does not know about the reachability of the mobile router "32" 12*h* serving the address prefix "32::/64", the mobile router 12*a* would drop the ping unless was specifically addressed to a destination address within the address prefix "1::/64" used by the clusterhead 12*a*. Also note that even though the mobile router 12*a* may know about the layer 2 (MAC) addresses of the mobile routers 12*b* and 12*c*, the mobile router 12*a* does not have information regarding the global IP addresses utilized by the mobile routers 12*b* and 12*c*; further, the mobile router 12*a* would not be able to locate the address prefixes used by the mobile routers 12*d*, 12*e*, 12*f*, 12*g*, 12*h*, 12*i*, and 12*j* because they do not share a layer 2 link with the mobile router 12*a*.

At this stage proactive routing protocols typically would be used to exchange topology and reachability information between the routers, and to ensure no loops were formed. However, the disclosed embodiment emphasizes minimizing the use of routing protocols due to their substantial costs that increase convergence times.

As described below, internal communications within the cluster 10 can be minimized using the neighbor advertisement messages 16, eliminating the necessity for optimizing procedures such as the proactive Optimized Routing Algorithm (ORA) MANET protocol. In contrast to all the mobile routers 12 registering with the clusterhead 12*a* to provide the clusterhead 12*a* with the source route path to all the prefixes 18, the clusterhead 12*a* simply needs to know which attachment address (e.g., 1::2 or 1::3) 20 should be used to reach the identified prefix 18.

Hence, each attached mobile router 12 sends to its attachment router a neighbor advertisement message 16 specifying that the prescribed address prefix used by the mobile router 12, and any address prefixes stored internally from received neighbor advertisement messages received by the attached mobile router from other mobile routers, are reachable via the default attachment address used by the mobile router 12.

Figure 2:
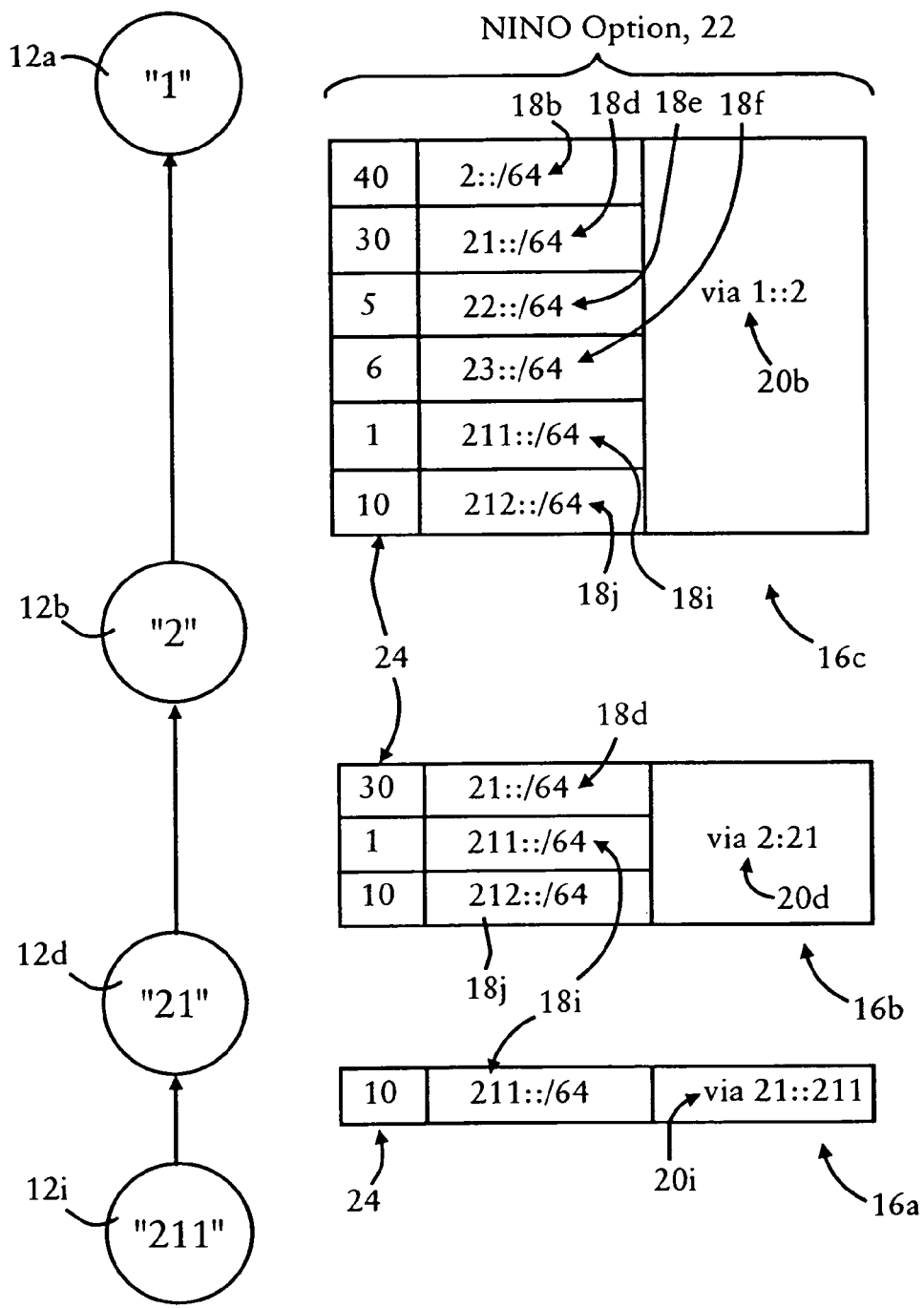
FIG. 2 is a diagram illustrating accumulation of network prefixes reachable by a single attachment address, based on mobile routers propagating respective neighbor advertisement messages toward the clusterhead, according to an embodiment of the present invention.

FIG. 2 is a diagram illustrating successive neighbor advertisement messages 16*a*, 16*b*, and 16*c* output by the respective mobile routers 12*i*, 12*d*, and 12*b* based on having attached to an attachment router according to the tree topology 10 of FIG. 1. As illustrated in FIG. 2, the mobile router 12*i* outputs the neighbor advertisement message 16*a* with a network-in-node option portion 22 specifying the address prefix ("211::/64") 18*i* used by the mobile router 12*i*, and the default attachment address 20*i* selected by the mobile router 12*i*. As described above, the default attachment address 20*i* is within the address space of the attachment prefix ("21::/64) 18*d* used by the mobile router 12*d* serving as an attachment router for the mobile router 12*i*.

The neighbor advertisement message 16*a* also includes a sequence identifier 24 for the corresponding address prefix 18*i*, described below.

The mobile router 12*d*, in response to receiving the neighbor advertisement message 16*a*, creates an entry in its internal ad hoc routing table that specifies that the address prefix ("211::/64") 18*i* is reachable via the attachment address ("21::211") 20*i*. As apparent from the foregoing, since the attachment address 20*i* is within the address space of the attachment prefix 18*d* used by the mobile router 12*d*, the mobile router 12*d* will know how to route any data packet to the attachment address 20*i* based on correlating the attachment address 20*i* to a prescribed ingress interface having a prescribed layer 2 (MAC) address. Although not shown, it is assumed the mobile router 12*d* also creates a routing table entry for the mobile router 12*j* in response to receiving a corresponding neighbor advertisement message 16 from the mobile router 12*j* specifying that its corresponding network prefix ("212::/64") 18*j* is reachable via its corresponding default attachment address ("21::212").

In response to creating the new entry in its internal ad hoc routing table, the mobile router 12*d* outputs the neighbor advertisement message 16*b* that specifies that the network address prefix 18*d* used by the mobile router 12*d*, as well as the network address prefixes 18*i* and 18*j* stored in its ad hoc routing table, are reachable via the default attachment address ("2::21") 20*d* of the mobile router 12*d*.

The mobile router 12*b* repeats the process of adding entries to its internal ad hoc routing table in response to receiving the neighbor advertisement message 16*b*, and the neighbor advertisement messages from the mobile router 12*e* and 12*f* specifying that the address prefixes "22::/64" 18*e* and "23::/64" 18*f* are reachable via the default attachment addresses "2::22" and "2::23", respectively. In response to adding the entries, the mobile router 12*b* outputs the neighbor advertisement message 16*c* specifying that its prescribed subnet prefix ("2::/64") 18*b*, plus the address prefixes 18*d*, 18*e*, 18*f*, 18*i*, and 18*j* stored in its internal ad hoc routing table are reachable via the default attachment address ("1::2") 20*b* of the mobile router 12*b*. Also note that each network prefix 18 specified in the neighbor advertisement message 16*a*, 16*b* has its corresponding sequence identifier 24 propagated up to the next neighbor advertisement message 16*c*. Although not shown in FIG. 2, each neighbor advertisement message 16 includes for each specified address prefix 18 a corresponding depth field that enables the router receiving the neighbor advertisement message 16 to identify the relative depth, also referred to as cost (e.g., hop count) 94 of reaching the corresponding address prefix 18.

Hence, in response to receiving the neighbor advertisement message 16*c* from the attached mobile router 12*b*, and a corresponding neighbor advertisement message 16 from the mobile router 12*c*, the mobile router 12*a* has sufficient address information to reach all of the subnet prefixes 18 in the network 10, and needs to choose simply whether to route a packet to the attachment address "1::2" or "1::3" within its prescribed subnet prefix "1::/64". As described below, each of the attached mobile routers also include cost information (94 in FIG. 5) that enables selective optimization of routing using peer links 30.

Figure 5:
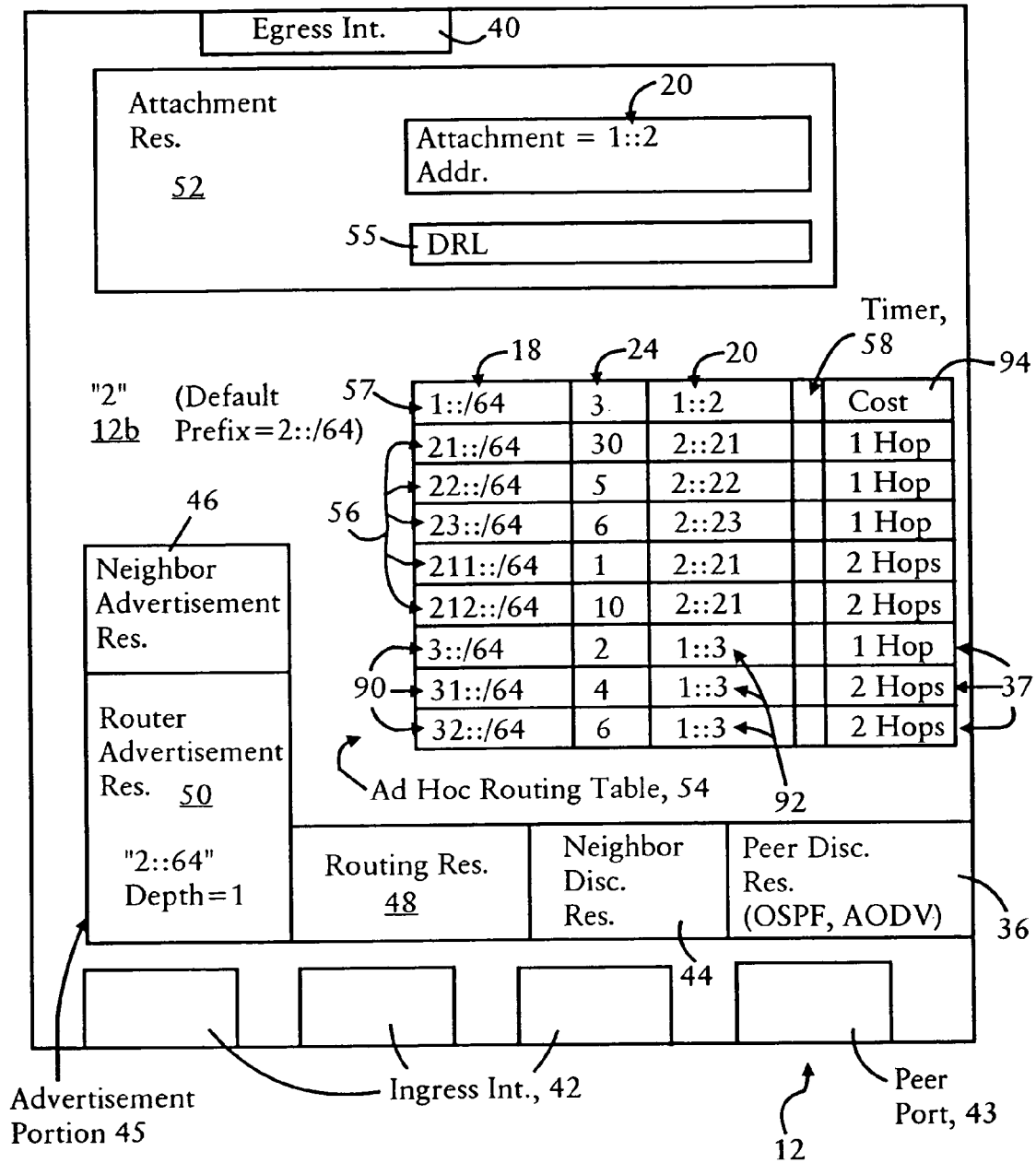
FIG. 5 is a diagram illustrating any one of the mobile routers of FIG. 1, according to an embodiment of the present invention.

FIG. 5 is a logical diagram illustrating one of the mobile routers 12, according to an embodiment of the present invention. For illustration sake, the mobile router 12b ("2") is illustrated in FIG. 5 to illustrate the values stored in the routing table 54. The mobile router 12 logically includes an egress port 40 configured for establishing an attachment link 32 with an attachment router (e.g., the clusterhead 12a), one or more peer ports 43 for establishing peer links 30 with peer routers, and multiple ingress ports 42 configured for outputting router advertisement messages and receiving neighbor advertisement messages 16. Each of the ingress and egress ports, as well as the peer port 43, are implemented logically at the network layer, such that network (IP) packets may be passed for transmission to at least one link layer interface, for example a interface configured for establishing wireless IEEE 802.11 links. As apparent from the foregoing, however, implementation of the logical peer port 43 may depend on the actual implementation of the wireless network interface device, such that the peer port 43 may actually be assigned to an available "ingress link interface" or an available "egress link interface", or an available "peer link interface" depending on the capabilities of the wireless network interface device.

The mobile router 12 also includes a peer discovery resource 36, a neighbor discovery resource 44, and an advertisement portion 45 that includes a neighbor advertisement resource 46 and a router advertisement resource 50. The mobile router 12 also includes a routing resource 48, an attachment resource 52, and an ad hoc routing table 54. The attachment resource 52 includes a default router list 55, illustrated in FIG. 4. As recognized in the art, each of these resources may be implemented as software based resources, such as executable code stored on a computer readable medium and which when executed by a microprocessor creates an application runtime environment in an assigned memory space; alternatively, these resources may be implemented as hardware-based state machines or by programming of field programmable gate arrays, or by mask programming of integrated circuits. The neighbor advertisement resource 46, the neighbor discovery resource 44, and the router advertisement resource 50 can be implemented for example in accordance with the Request for Comments (RFC) 2461, Neighbor Discovery for IP version 6 (IPv6), published by the IETF. The peer discovery resource 36 can be implemented for example to perform discovery of peer mobile routers using OSPF protocol or AODV protocol.

Figure 3:
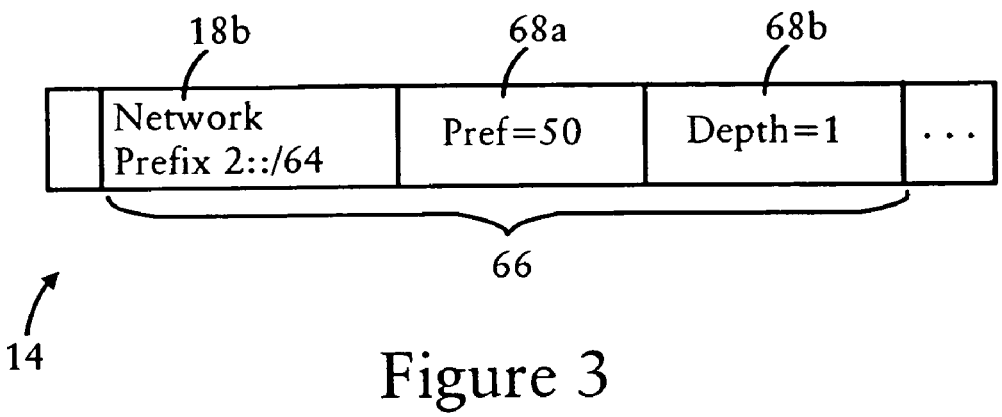
FIG. 3 is a diagram illustrating in detail a router advertisement message having tree information option fields.

The neighbor advertisement resource 46 is configured for outputting advertisement messages 14 including the tree information option field 66, illustrated in FIG. 3. In particular, the advertisement message 14 output by the mobile router 12b specifies within the tree information option field 66 the network prefix 18b, a preference value 68a, and/or a tree depth 68b. The preference field 68a is configured for storing a preference value for the mobile router 12 as stored in a corresponding preference register (not shown), enabling a mobile router receiving the RA message 14 to decide whether to associate with the source of the RA message 14. The tree depth field 68b is configured for storing the depth of the mobile router 12 within the tree (i.e., the number of hops to the clusterhead), enabling other routers receiving the RA message 34 to determine the relative position of the router advertisement originator within the tree 10.

The neighbor discovery resource 44 is configured for adding tree entries 56 to the ad hoc routing table 54 based on receiving the respective neighbor advertisement messages 16. The neighbor discovery resource 44 also is configured for determining whether to overwrite an existing tree entry 56 based on receiving another neighbor advertisement message 16 that specifies a sequence number 24 for the corresponding address prefix 18 that is higher than the stored sequence number 24. The neighbor discovery resource 44 also is configured for selectively deleting the tree entry 56, for example based on determining that an inactivity timer entry value 58 indicates, when compared with an internal system clock, that a prescribed inactivity interval has elapsed, requiring the inactive tree entry 56 be removed from the table 54.

The attachment resource 52 includes a default router list 55, enabling the attachment resource 52 to select an attachment router from the corresponding router advertisement message 14 according to selection criteria as specified by the corresponding preference value 68a and/or tree depth value 68b, to ensure that the attachment router is selected in a manner to ensure the tree topology is maintained in the ad hoc network. Hence, the attachment resource 52 is responsible for implementing the protocol requiring establishment of the tree topology in the ad hoc network. Additional details regarding selection of an attachment router to ensure a tree-based topology is described in the above-incorporated application Ser. No. 10/218,515, published Feb. 19, 2004.

Figure 4:
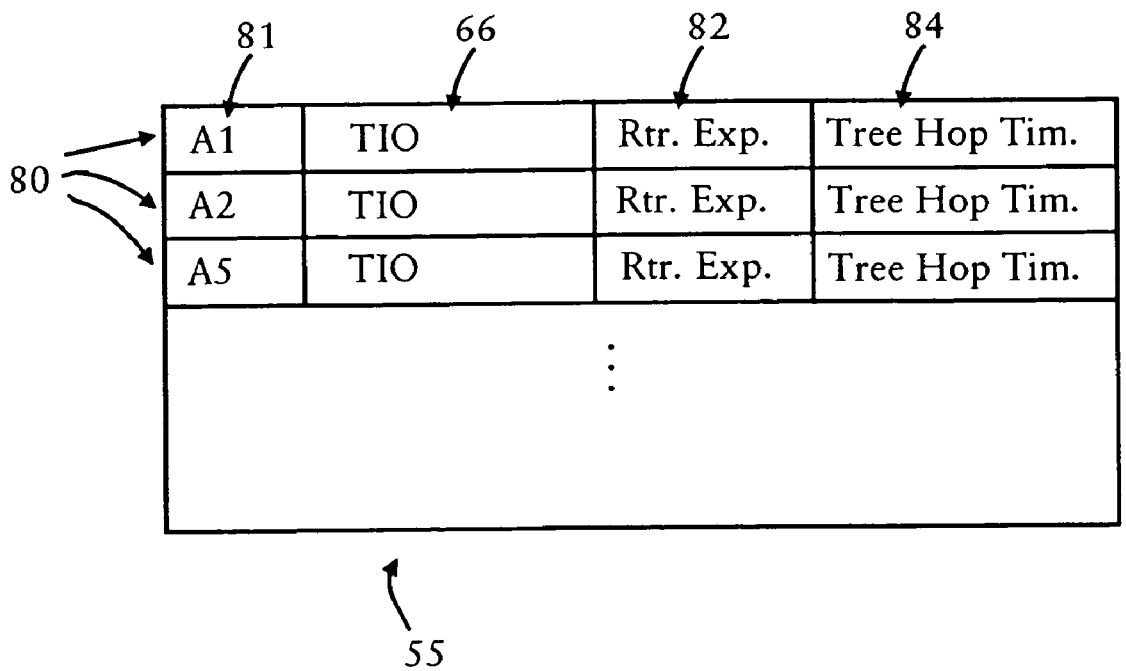
FIG. 4 is a diagram illustrating in detail a default router list configured for storing default router list entries including tree information option fields from received router advertisement messages.

In summary, the default router list 55, illustrated in FIG. 4, is configured for storing the known trees 38 in an ordered list, per order of preference, by extending IPv6 default router lists to include tree information. In particular, each entry 80 of the default router list 55 includes a router address field 81, the tree information option fields 66 as received from the router advertisement message 14, a router expiration timer field 82 that specifies information, including timer ID, to determine the expiration of the entry, and a tree hop timer field 84 that specifies information, including a corresponding timer ID, to delay any response to a received RA message in order to provide tree stability.

A timer resource in the attachment resource 52 is configured for calculating timer values from the timer information stored in the fields 82, 84, to determine if the corresponding timer has expired, requiring priority determination or selection operations.

Hence, the attachment resource 52 in each router 12 independently determines whether to associate with another router advertisement originator having output an RA message based on the tree information segment 66 within the RA message 14: the tree information segment 66 specifies attributes 68 about the tree to which the router advertisement originator is associated, including tree identifier (address prefix) tree depth, and tree preference. Once stored as entries in the default router list 55, the priority determination resource 42 can maintain the known trees in an ordered list, per order of preference: each entry 80 is maintained until the corresponding router expiration timer field 82 expires.

It should be noted that multiple trees typically should be present in the ad hoc network 10 only during initial formation of the tree-based topology: in other words, smaller trees will eventually converge into a single larger tree, resulting in more stability and connectivity throughout the entire ad hoc network. Nevertheless, the use of neighbor advertisement messages can still used in individual trees during network formation, since the relatively low overhead enables information to be quickly updated with rapid convergence.

The attachment resource 52 in the mobile router (e.g., 12b) identifies the selected attachment router (e.g., 12a) by choosing a default attachment address (e.g., "1::2") 20 within the address space of the advertised prefix (i.e., the attachment prefix) (e.g., "1::/64"), and adding a table entry 57 that specifies that the attachment prefix (e.g., "1::/64") is reachable via the default attachment address ("1::2") 20.

The mobile router 12 of FIG. 5 (e.g., 12b) also includes a neighbor advertisement resource 46. As described above with respect to FIG. 2, the neighbor advertisement resource 46 is configured for outputting the corresponding neighbor advertisement message 16 (e.g., 16c) specifying the corresponding address prefix (e.g., "2::/64" 18b) used by the mobile router, as well as the address prefixes (e.g., 18d, 18e, 18f, 18i, 18j) stored in the ad hoc routing table 54 by the neighbor discovery resource 44 in response to received neighbor advertisement messages 16 from attached mobile routers, are reachable via the default attachment address 20 (e.g. "1::2" 20b). As described below, however, the neighbor advertisement message 16 does not include any of the peer routing information stored in peer entries 37 within the ad hoc routing table 54.

The routing resource 48 is configured for routing a received data packet having a specified destination address. If the specified destination address is within the address realms of one of the address prefixes stored in the ad hoc routing table 54, the routing resource 48 outputs the data packet to the specified attachment address 20. However, if the specified destination is unknown (i.e., no common prefix specified within the ad hoc routing table 54), the data packet is output using the default attachment address 20 to the attachment router via the egress port 40, based on the assumption that the attachment router will have more routing information. If the mobile router 12 does not have an attachment router and the specified destination is unknown, the packet is dropped.

The peer discovery resource 36 is configured for operating independent of the advertisement portion 45, and is configured for enabling the mobile router 12 to selectively share its routing information stored in the ad hoc routing table 54 with other peer routers at the same depth within the tree 10. Hence, the peer discovery resource 36 will supply to other peer routers the address prefixes 18 stored in the ad hoc routing table 54, indicating to the peer routers that the address prefixes 18 identified by entries 56 and 57 (and remote address prefixes 90 in entries 37, described below) in the ad hoc routing table 54 are reachable via the mobile router 12.

In addition, the peer discovery resource 36 is configured for selectively storing peer entries 37 specifying remote address prefixes 90, received from peer routers, into the ad hoc routing table 54. In particular, the peer discovery resource 36 in the router (e.g., 12b) is configured for receiving from a peer router (e.g., 12c) the routing information stored by the peer router, including remote address prefixes 90, the corresponding address 92 used by the peer router providing reachability for the remote address prefixes 90, and a cost attribute 94 identifying the relative cost for reaching the associated remote address prefix 90. The cost attribute 94 is illustrated as a number of hops attribute, although it will be appreciated that other cost attributes may be utilized in accordance with OSPF or AODV protocols. As described below, the peer discovery resource 36 selectively adds the received peer routing information to the ad hoc routing table 54 based on determining that the associated costs attributes 94 do not exceed a determined threshold.

Figure 6A:
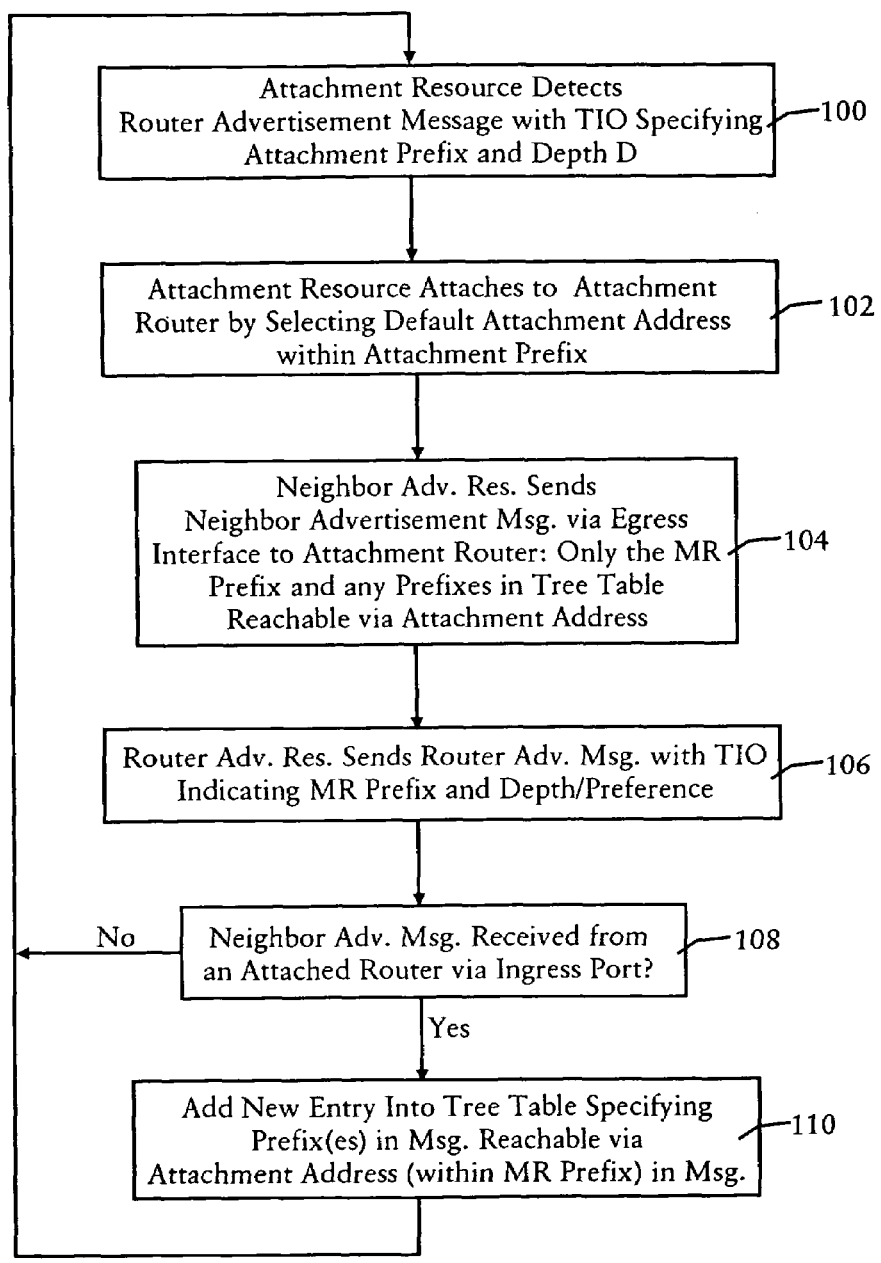
FIGS. 6A, 6B, and 6C are diagrams summarizing the method by the routers of FIG. 1 of establishing an ad hoc network, according to an embodiment of the present invention.
Figure 6B:
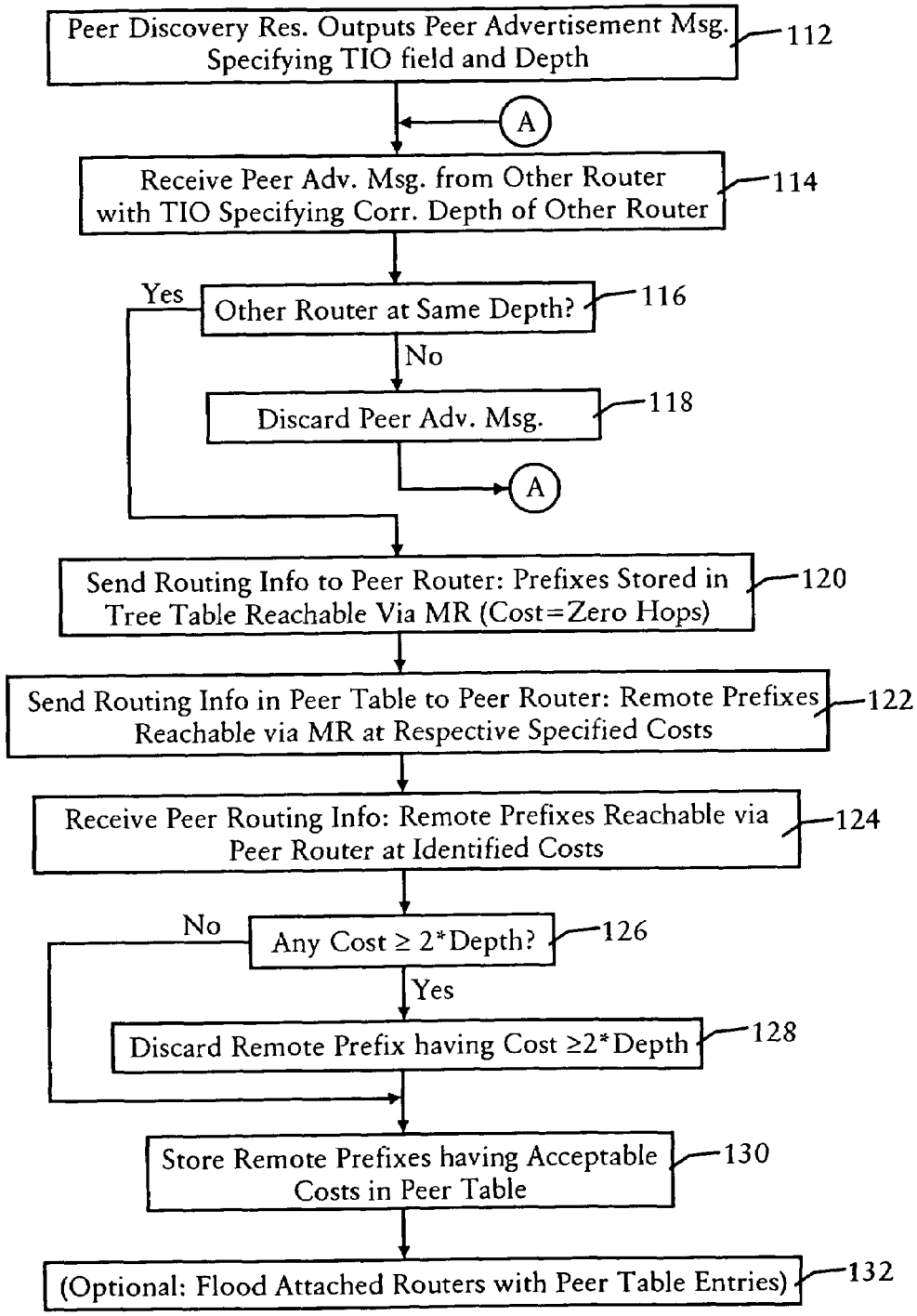
Figure 6C:
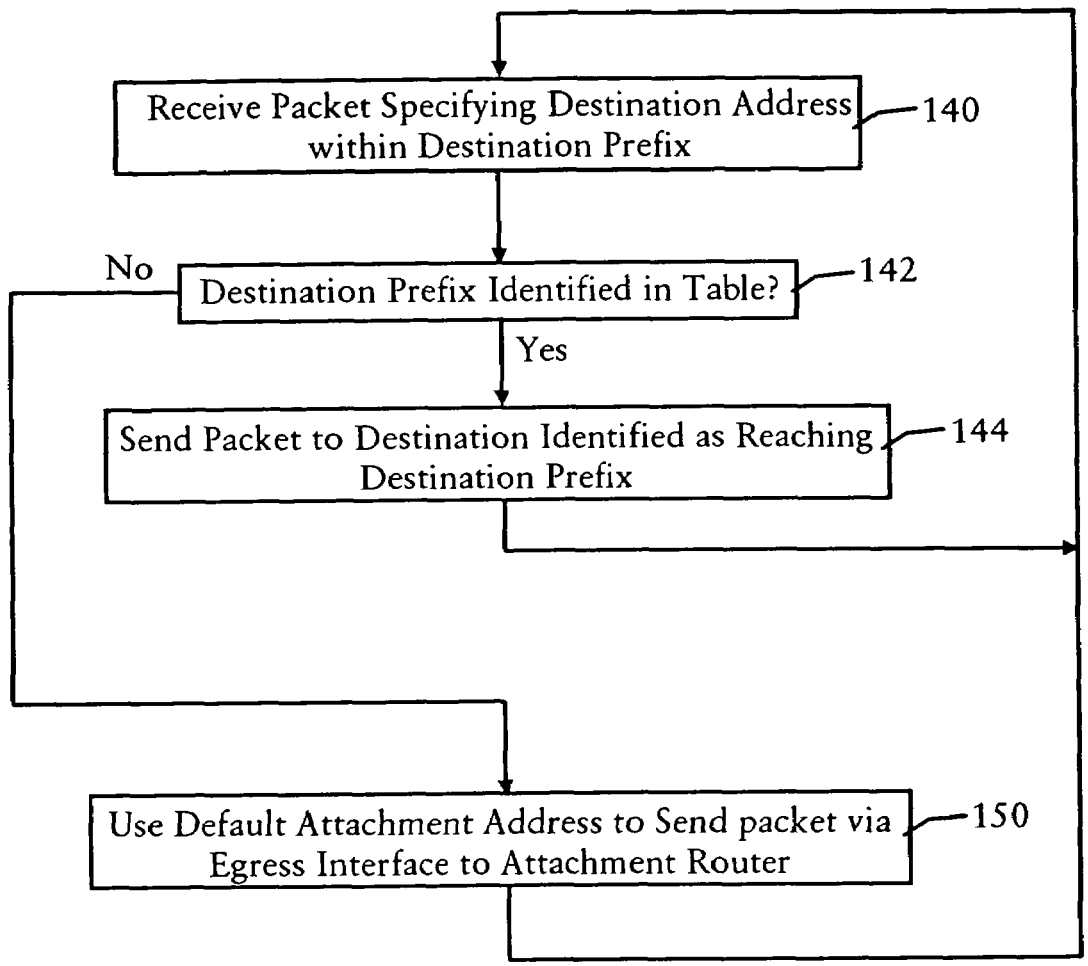

FIGS. 6A, 6B and 6C are diagrams illustrating the method of establishing an ad hoc network by the mobile router of FIG. 5, according to an embodiment of the present invention. The steps described in FIGS. 6A-6C can be implemented as executable code stored on a computer readable medium (e.g., a hard disk drive, a floppy drive, a random access memory, a read only memory, an EPROM, a compact disk, etc.), or propagated via a computer readable medium (e.g., a transmission wire, an optical fiber, a wireless transmission medium utilizing an electromagnetic carrier wave, etc.).

The method begins in step 100, where the attachment resource 52 determines whether any new router advertisement messages 14 has been received. If a new router advertisement message 14 has been received, the attachment resource 52 stores the router advertisement information in the default router list 55, and attaches in step 102 to an attachment router by selecting a default attachment address 20 within the attachment prefix 18. In particular, the attachment resource 52 determines whether the tree information option (TIO) for the received router advertisement message 14 indicates a preferred depth closer to the clusterhead 12a, or a higher preference. If a preferred depth or higher preference is detected, the attachment resource 52 attaches to the attachment router by selecting a default attachment address 20 from within the attachment prefix advertised in the router advertisement message.

The neighbor advertisement resource 46 in response sends in step 104 the neighbor advertisement message 16 to the attachment router in accordance with event 62 of FIG. 6, specifying that the default mobile router prefix used by the mobile router, and any prefixes specified in the ad hoc routing table 54, are reachable via the selected attachment address. Note, however, that the neighbor advertisement message 16 does not include any peer routing information from the peer entries 37 in the ad hoc routing table 54.

The router advertisement resource 50 outputs in step 106 the corresponding router advertisement message 14, specifying the prescribed address prefix 18 used by the mobile router, and the preference and depth information 68a, 68b, as illustrated in FIG. 3.

The neighbor discovery resource 44 determines in step 108 whether any neighbor advertisement messages 16 have been received from an attached router via the ingress ports 42. In particular, implementation of the ingress port 42 involves selectively accepting neighbor advertisement messages 16 from the wireless link that are not from the router identified as the attachment router: an neighbor advertisement messages 16 received via the wireless link from the attachment router are discarded.

Assuming a neighbor advertisement message 16 has been received via the ingress interface, the neighbor discovery resource 44 determines whether the new message 16 specifies a new neighbor prefix 18 that is not present in the ad hoc routing table 54. If the new message 16 specifies a new neighbor prefix 18, the neighbor discovery resource 44 adds the new tree entry 56 to the ad hoc routing table 54 in step 110, and sends an updated neighbor advertisement message 16 in step 104.

Additional details regarding updating the topology of the tree 10 using the neighbor advertisement messages 16, including updating the neighbor advertisement messages 16 in response to detected movement within the tree 10, is described in further detail in the above-incorporated application Ser. No. 10/856,809.

FIG. 6B describes the method by the peer discovery resource 36 of identifying peer routers, and sharing routing information with peer mobile routers, according to an embodiment of the present invention. The peer discovery resource 36 outputs in step 112 a peer advertisement message, essentially identical to the router advertisement message 14, that specifies the tree information option field 66 including the depth 68*b*. Assuming in step 114 that the mobile router receives a peer advertisement message from another router having a tree information option 66 specifying a corresponding depth the 68*b* of the other router, the peer discovery resource 36 determines in step 116 whether the depth field 68*b* indicates that the other router having sent the peer advertisement message is at the same depth within the tree 10 as the mobile router.

If the peer discovery resource 36 determines that the other router is not at the same depth, the peer discovery resource 36 discards the peer advertisement message in step 118. If, however, the other router is at the same depth, and therefore a peer router within the tree 10, the peer discovery resource 36 sends in step 120 the routing information from the default entry 57 and the tree entries 56 of the ad hoc routing table 54, namely that the prefixes 18 stored in the ad hoc routing table 54 are reachable via the mobile router (e.g., using the attachment address 20) at a cost of zero hops; the peer router, upon receiving the routing information from the ad hoc routing table 54, will store the information in its ad hoc routing table 54, and increment the cost attributes to indicate reachability via one hop. The peer discovery resource 36 also sends to the peer router in step 122 the routing information in the peer entries 37 ad hoc routing table 54, including that the remote prefixes 90 are reachable via the mobile router's attachment address 20 at the cost specified in the cost attribute field 94. Steps 120 and 122 are illustrated separately for to simplify description: it will be appreciated that the peer discovery resource 36 could simply "flood" the peer router with the entire ad hoc routing table 54, if desired.

The peer discovery resource 36 also will receive in step 124 the peer routing information from the peer router via the peer port 43, according to the prescribed routing protocol (e.g., OSPF, AODV). As described above, the peer port 43 is implemented by dropping any packets received from the wireless link carrying peer routing information that are sent from any network nodes that is identified either as an attached router or the attachment router. The peer discovery resource 36 determines in step 126 whether any of the remote prefixes specified within the peer routing information exceed a determined cost, for example whether the cost is greater than or equal to twice the depth, indicating the network distance is greater than via the clusterhead. If any cost is greater than the determined threshold, the remote prefix having the unacceptable cost is discarded in step 128, and the remaining remote prefixes having acceptable costs are stored as new peer entries 37 into the ad hoc routing table 54 in step 130. If desired, the peer discovery resource 36 also may flood the attached routers with the table entries via the ingress interfaces 42. As described earlier, however, the peer routing information is never sent in the neighbor advertisement message 16 that is sent toward the clusterhead. Hence, the peer routing information stored in the ad hoc routing table 54 is limited to the peer routers and subtrees below the peer routers.

Figure 7:
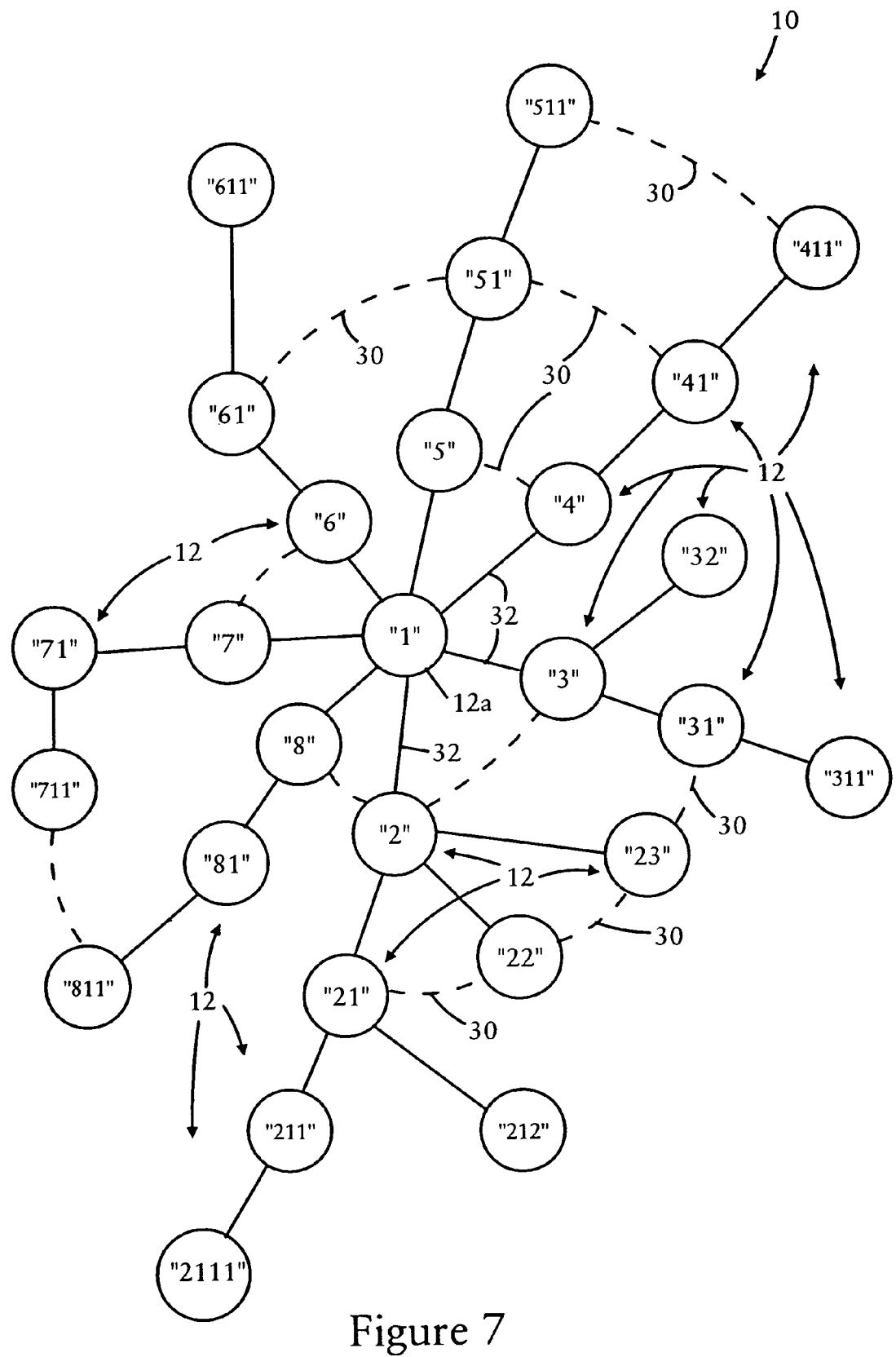
FIG. 7 is diagram illustrating another view of the ad hoc network of FIG. 1, including the optimized peer links, according to an embodiment of the present invention.

In addition, the peer routing information is selectively stored in the ad hoc routing table 54 only if the associated costs are determined not to exceed a determined threshold. Hence, as illustrated in FIG. 7, the peer links 30 that optimize the communication within the tree 10 is limited to ensure that only a limited number of peer routers are connected together via the peer links 30 to prevent deterioration of the tree 10 due to excessive flooding of routing information that would provide marginal benefits to the tree 10. Hence, the cost-based selection whether to add remote indexes 90 to the ad hoc routing table 54 ensures that the flooding of routing information is limited to acceptable levels that do not impact the dynamic convergence abilities of the tree 10, and which do not adversely affect optimization of the tree 10 in distributing traffic. FIG. 6C is a diagram illustrating the routing of packets by the routing resource 48, according to an embodiment of the present invention. In response to receiving in step 140 a packet that specifies a destination address within a destination prefix, the routing resource 48 determines in step 142 whether the destination prefix (e.g., 18 or 90) is identified within the ad hoc routing table 54. If in step 142 the destination prefix is identified within the ad hoc routing table 54, the routing resource 48 sends in step 144 the packet to the destination (e.g., 20 or 92) identified as reaching the destination prefix 90, for example an attached router, or a peer router. If the destination prefix is not identified within the ad hoc routing table 54, the routing resource 48 uses the default attachment address in step 150 to send the packet via the egress interface 40 to the attachment router 12.

According to the disclosed embodiment, mobile routers can establish a proactive routing protocol with minimal overhead by using neighbor advertisement messages sent toward the clusterhead. Two routing protocols are used to populate the ad hoc routing table, 54, namely neighbor discovery and advertisement for establishment of the tree topology, and limited peer discovery for establishment of peer links 30 for optimization of the tree topology; hence, the tree-based ad hoc network can provide a rapid convergence in order to quickly adapt to changes in the tree. Any conflicts encountered in the ad hoc routing table due to movement of a mobile router within the tree is resolved in favor of the new tree topology, such that any conflicting peer entry 37 is discarded. Moreover, communication in the tree can be optimized based on peer routers sharing limited routing information via peer links in a manner that ensures that performance of the tree is not compromised.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a mobile router configured for establishing communications within an ad hoc network, the method comprising:

attaching to an attachment router, having advertised an attachment prefix, based on selecting a default attachment address within the attachment prefix and according to a protocol requiring establishment in the ad hoc network of a tree topology having a single clusterhead, the mobile router attaching to the attachment router at an identifiable depth relative to the clusterhead and advertising a first address prefix distinct from the attachment prefix;

receiving at least one neighbor advertisement message from at least one corresponding attached mobile router having attached to the mobile router and that specifies a corresponding second address prefix, distinct from the first address prefix, is reachable via a corresponding second attachment address within the address space of the first address prefix;

selectively sharing routing information with a peer mobile router attached within the tree topology at said identifiable depth, including:

(1) sending to the peer mobile router first routing information, composed of the first address prefix and any second address prefixes having been received from neighbor advertisement messages, as reachable via the mobile router, and (2) receiving from the peer mobile router second routing information specifying at least one remote address prefix is reachable via the peer mobile router, the at least one remote address prefix distinct from any of the attachment prefix, the first address prefix, and any second address prefix; and outputting to the attachment router a second neighbor advertisement message specifying the first routing information, wherein the second routing information received from any peer mobile router attached at said identifiable depth is not sent to the attachment router.

2. The method of claim 1, wherein the first routing information includes address prefixes of respective mobile routers having attached within the tree topology to reach the clusterhead via the mobile router.

3. The method of claim 2, wherein the selectively sharing further includes:

receiving an advertisement message from the peer mobile router that includes a tree information option field specifying the identifiable depth; and sending the first routing information to the peer mobile router based on the received advertisement message specifying that the mobile router and the peer mobile router are attached within the tree topology at the identifiable depth.

4. The method of claim 3, wherein the outputting of the second neighbor advertisement message specifying the first routing information is executed according to a first routing protocol, and the selectively sharing of the routing information is executed according to a second routing protocol distinct and independent from the first routing protocol.

5. The method of claim 4, wherein the first routing protocol is any one of OSPF and AODV protocol.

6. The method of claim 1, further comprising:

receiving a packet having a destination address within a destination prefix;

accessing a routing table configured for specifying the first routing information and the second routing information received from said any peer mobile router, and selectively outputting the packet to an identified destination based on a match between the destination prefix and a corresponding entry in the routing table that specifies the destination prefix and the identified destination; and outputting the packet to the attachment router based on a determined absence of the destination prefix in any one of the first routing table and the second routing table.

7. The method of claim 6, wherein the outputting includes sending within the second neighbor advertisement message the address prefixes received from the neighbor advertisement messages, and not any of the second routing information stored in the routing table.

8. The method of claim 6, further comprising sending to another peer mobile router the first routing information specified in the routing table, and the second routing information consisting of (1) selected address prefixes in the second routing table that are reachable via the mobile router within a prescribed cost attribute, and (2) respective cost attributes of the selected address prefixes in the second routing table.

9. The method of claim 8, further comprising selectively storing the at least one remote address prefix in the routing table based on determining from the corresponding cost attributes that the at least one remote address prefix is reachable within a prescribed network distance.

10. The method of claim 9, wherein the prescribed network distance specifies a prescribed number of hop counts between the mobile router and the one peer mobile router serving as an attachment router for the associated remote address prefix, the prescribed network distance being less than twice the identifiable depth.

11. An ad hoc network comprising:

a plurality of mobile routers having organized into a tree topology having attached mobile routers having attached to attachment routers, one of the attachment routers serving as a clusterhead, each mobile router including:

(1) an attachment resource configured for enabling the corresponding mobile router to attach to one of the attachment routers as a corresponding one of the attached mobile routers;

(2) an advertisement portion configured for enabling the corresponding mobile router to serve as one of the attachment routers for at least one of the attached mobile routers, the advertisement portion further configured for:

(a) outputting a first advertisement message and that includes a tree information option field that specifies a prescribed address prefix used by the corresponding mobile router, and a tree attribute field that identifies a corresponding depth of the corresponding mobile router within the tree topology, the clusterhead specifying a zero depth, and (b) selectively outputting, to the corresponding attachment router, a neighbor advertisement message based on the corresponding mobile router being one of the attached mobile routers, the neighbor advertisement message specifying that at least the corresponding prescribed address prefix, and any received address prefixes from any received neighbor advertisement messages from respective attached mobile routers, are reachable via a corresponding attachment address used by the corresponding mobile router to attach to the corresponding attachment router, the attachment address of the corresponding mobile router within the prescribed address prefix of the corresponding attachment router;

(3) a peer discovery resource independent of the advertisement portion and configured for enabling the corresponding mobile router, as one of the attached mobile routers, to selectively share routing information with another one of the attached mobile routers having a matching depth within the tree topology, the routing information including that the corresponding address prefix and the received address prefixes are reachable via the corresponding attachment address; and (4) a routing table configured for storing peer routing information having been received from said another one of the attached mobile routers.

12. The network of claim 11, wherein the peer discovery resource is configured for selectively sharing the routing information based on receiving an advertisement message from said another one of the attached mobile routers that includes a corresponding tree information option field specifying the matching depth.

13. The network of claim 12, wherein the advertisement portion is configured for outputting the neighbor advertisement message without any of the peer routing information.

14. The network of claim 13, wherein the peer discovery resource is configured for sharing the routing information, and receive the peer routing information, according to any one of OSPF and AODV protocol.

15. The network of claim 11, wherein:
the routing table is configured for storing the received address prefixes and respective attachment addresses that are within the corresponding prescribed address prefix; and
each mobile router further includes a routing resource configured for determining a destination for a packet having been received and specifying a destination address within a destination prefix, the corresponding routing resource configured for selecting the egress interface as the destination based on a determined absence of the destination prefix in the corresponding routing table.

16. The network of claim 15, wherein the advertisement portion is configured for specifying within the corresponding neighbor advertisement message the received address prefixes stored in the second table, and not any of the peer routing information stored in the routing table.

17. The network of claim 15, wherein the peer discovery resource is configured for sending to a second one of the attached mobile routers having the matching depth the received address prefixes specified in the routing table, selected remote address prefixes from the peer routing information in the routing table that are reachable via the corresponding mobile router within a prescribed cost attribute, and respective cost attributes of the selected remote address prefixes.

18. The network of claim 17, wherein the peer discovery resource is configured for selectively storing the remote address prefixes in the routing table based on determining from the respective cost attributes that the remote address prefixes are reachable within a prescribed network distance.

19. The network of claim 18, wherein the prescribed network distance specifies a prescribed number of hop counts between the corresponding mobile router and the mobile router serving as an attachment router for the associated remote address prefix, the prescribed network distance being less than twice the identifiable depth.

20. A mobile router comprising:
an advertisement portion configured for:
(a) outputting a first advertisement message that includes a tree information option field that specifies a prescribed address prefix used by the mobile router, and a tree attribute field that identifies a corresponding depth of the mobile router within a tree topology having a plurality of attached mobile routers attached to a plurality of attachment routers, one of the attachment routers being a clusterhead of the tree topology and having a zero depth, and
(b) selectively outputting a neighbor advertisement message based on the mobile router being one of the attached mobile routers, the neighbor advertisement message specifying that at least the prescribed address prefix, and any received address prefixes from any received neighbor advertisement messages from respective attached mobile routers, are reachable via a corresponding attachment address used by the mobile router to attach to a corresponding attachment router, the attachment address of the mobile router within a prescribed address prefix of the corresponding attachment router;
a peer discovery resource independent of the advertisement portion and configured for enabling the mobile router, as one of the attached mobile routers, to selectively share routing information with another one of the attached mobile routers having a matching depth within the tree topology, the routing information including that the corresponding address prefix and the received address prefixes are reachable via the corresponding attachment address; and
a routing table configured for storing peer routing information having been received from said another one of the attached mobile routers.

21. The mobile router of claim 20, wherein the peer discovery resource is configured for selectively sharing the routing information based on receiving an advertisement message from said another one of the attached mobile routers that includes a corresponding tree information option field specifying the matching depth.

22. The mobile router of claim 21, wherein the advertisement portion is configured for outputting the neighbor advertisement message without any of the peer routing information.

23. The mobile router of claim 22, wherein the peer discovery resource is configured for sharing the routing information, and receive the peer routing information, according to any one of OSPF and AODV protocol.

24. The mobile router of claim 20, wherein:
the routing table is configured for storing the received address prefixes and respective attachment addresses that are within the prescribed address prefix;
the mobile router further comprising a routing resource configured for determining a destination for a packet having been received and specifying a destination address within a destination prefix, the routing resource configured for selecting the attachment router as the destination based on a determined absence of the destination prefix in the routing table.

25. The mobile router of claim 24, wherein the advertisement portion is configured for specifying within the neighbor advertisement message the received address prefixes stored in the routing table, and not any of the peer routing information stored in the routing table.

26. The mobile router of claim 24, wherein the peer discovery resource is configured for sending to a second one of the attached mobile routers having the matching depth the received address prefixes specified in the routing table, selected remote address prefixes from the peer routing information in the routing table that are reachable via the corresponding mobile router within a prescribed cost attribute, and respective cost attributes of the selected remote address prefixes.

27. The mobile router of claim 26, wherein the peer discovery resource is configured for selectively storing the remote address prefixes in the routing table based on determining from the respective cost attributes that the remote address prefixes are reachable within a prescribed network distance.

28. The mobile router of claim 27, wherein the prescribed network distance specifies a prescribed number of hop counts between the mobile router and the mobile router serving as an attachment router for the associated remote address prefix, the prescribed network distance being less than twice the identifiable depth.

29. A mobile router comprising:
advertisement means for outputting a first advertisement message that includes a tree information option field that specifies a prescribed address prefix used by the mobile router, and a tree attribute field that identifies a corresponding depth of the mobile router within a tree topology having a plurality of attached mobile routers attached to a plurality of attachment routers, one of the attachment routers being a clusterhead of the tree topology and having a zero depth;
the advertisement means further configured for selectively outputting a neighbor advertisement message based on the mobile router being one of the attached mobile routers, the neighbor advertisement message specifying that at least the prescribed address prefix, and any received address prefixes from any received neighbor advertisement messages from respective attached mobile routers, are reachable via a corresponding attachment address used by the mobile router to attach to a corresponding attachment router, the attachment address of the mobile router within a prescribed address prefix of the corresponding attachment router;
peer discovery means, independent of the advertisement means, for enabling the mobile router, as one of the attached mobile routers, to selectively share routing information with another one of the attached mobile routers having a matching depth within the tree topology, the routing information including that the corresponding address prefix and the received address prefixes are reachable via the corresponding attachment address; and
storage means for storing peer routing information having been received from said another one of the attached mobile routers.

30. The mobile router of claim 29, wherein the peer discovery means is configured for selectively sharing the routing information based on receiving an advertisement message from said another one of the attached mobile routers that includes a corresponding tree information option field specifying the matching depth.

31. The mobile router of claim 30, wherein the advertisement means is configured for outputting the neighbor advertisement message without any of the peer routing information.

32. The mobile router of claim 31, wherein the peer discovery means is configured for sharing the routing information, and receive the peer routing information, according to any one of OSPF and AODV protocol.

33. The mobile router of claim 29, wherein:
the storage means is configured for storing the received address prefixes and respective attachment addresses that are within the prescribed address prefix;
the mobile router further comprising routing means for determining a destination for a packet having been received and specifying a destination address within a destination prefix, the routing means configured for selecting the egress interface as the destination based on a determined absence of the destination prefix in the storage means.

34. The mobile router of claim 33, wherein the advertisement means is configured for specifying within the neighbor advertisement message the received address prefixes stored in the storage means, and not any of the peer routing information stored in the storage means.

35. The mobile router of claim 34, wherein the peer discovery means is configured for sending to a second one of the attached mobile routers having the matching depth the received address prefixes specified in the storage means, selected remote address prefixes from the peer routing information in the storage means that are reachable via the corresponding mobile router within a prescribed cost attribute, and respective cost attributes of the selected remote address prefixes.

36. The mobile router of claim 35, wherein the peer discovery means is configured for selectively storing the remote address prefixes in the storage means based on determining from the respective cost attributes that the remote address prefixes are reachable within a prescribed network distance.

37. The mobile router of claim 36, wherein the prescribed network distance specifies a prescribed number of hop counts between the mobile router and the mobile router serving as an attachment router for the associated remote address prefix, the prescribed network distance being less than twice the identifiable depth.

* * * * *